United States Patent [19]
Yamaguchi et al.

[11] Patent Number: 5,936,322
[45] Date of Patent: Aug. 10, 1999

[54] PERMANENT MAGNET TYPE SYNCHRONOUS MOTOR

[75] Inventors: Yasuo Yamaguchi, Hekinan; Masahiro Hasebe, Anjo, both of Japan

[73] Assignee: Aisin Aw Co., LTD., Japan

[21] Appl. No.: 08/774,704

[22] Filed: Dec. 26, 1996

[30] Foreign Application Priority Data

Dec. 26, 1995 [JP] Japan .................................... 7-338799

[51] Int. Cl.⁶ .................................................. H02K 21/12
[52] U.S. Cl. .......................... 310/156; 310/261; 310/262; 310/254; 310/265; 310/269
[58] Field of Search .................................... 310/156, 261, 310/262, 265, 269, 254

[56] References Cited

U.S. PATENT DOCUMENTS

| | | | |
|---|---|---|---|
| 4,575,652 | 3/1986 | Gogue | 310/49 R |
| 5,038,065 | 8/1991 | Matsubayashi et al. | 310/162 |
| 5,170,083 | 12/1992 | Burgbacher | 310/51 |
| 5,250,867 | 10/1993 | Gizaw | 310/179 |
| 5,519,266 | 5/1996 | Chitayat | 310/12 |
| 5,631,512 | 5/1997 | Kawabata et al. | 310/156 |

FOREIGN PATENT DOCUMENTS

1286758  11/1989  Japan ....................................... 310/156

*Primary Examiner*—Elvin G. Enad
*Attorney, Agent, or Firm*—Lorusso & Loud

[57] ABSTRACT

A permanent magnet type synchronous motor has a stator having teeth that are circumferentially aligned, and a rotor disposed radially inward of the stator. The rotor is made up of permanent magnets facing the teeth and mounted on a rotor core having protrusions that protrude radially outward between the permanent magnets. To suppress cogging, the width of the protrusions is determined such that the inter-pole core central angle $\theta$ is in the range: $\theta_{MIN} < \theta \leq \theta_{MIN}$ where $\theta_{MIN}$ is the angle formed between two straight lines extending from the center of the rotor shaft to midpoints of the two tooth side faces that are the farthest apart from each other among the tooth side faces of teeth facing one of the protrusions, and $\theta_{MAX}$ is the angle formed between the two straight lines extending from the center of the rotor shaft to the two tooth-head ends that are the farthest apart from each other among the tooth-head ends of teeth that face one of protrusions.

4 Claims, 9 Drawing Sheets

PERMANENT MAGNET TYPE SYNCHRONOUS MOTOR

BACKGROUND OF THE INVENTION

1. Field of the Invention

The present invention relates to a permanent magnet type synchronous motor.

2. Description of the Related Art

Conventional permanent magnet type synchronous electric motors employ permanent magnets as the magnetic poles of a rotor, around which a stator is disposed. The stator has a plurality of teeth that face the rotor. When the coils formed on the stator are energized, a magnetic flux is induced by the current through the coils, creating repelling and attracting forces between the stator and the rotor which cause the rotor to rotate.

Since slots are formed between the teeth and the permanent magnets on the rotor are spaced from each other, the magnetic flux passing through a tooth will pass through the neighboring tooth in the next moment as the rotor rotates. When an edge of a permanent magnet passes by a slot, the magnetic flux becomes discontinuous. Thus the magnetic reactance changes so that the force of attraction between the stator and the rotor fluctuates, resulting in cogging.

To suppress cogging, Japanese patent application laid-open No. HEI-1-286758 discloses a rotor having protrusions extending radially outward between the permanent magnets. The relationship between the width A of the protrusions and the slot pitch B may be represented as follows:

$$A=(n+½)\times B$$

where n is a constant.

In a case where the opposite ends of each of the rotor protrusions have holding portions or lugs for holding the permanent magnets, the magnet holding portions are included in the measurement of the protrusion width A.

However, this conventional motor suffers from cogging, i.e. variations in motor torque caused by variations in magnetic flux due to the differences in alignment of the rotor and stator teeth at various positions of the rotor.

SUMMARY OF THE INVENTION

Accordingly, it is an object of the invention to provide a permanent magnet type synchronous electric motor that sufficiently suppresses cogging while eliminating the aforementioned problems of the prior art.

Figure 4:
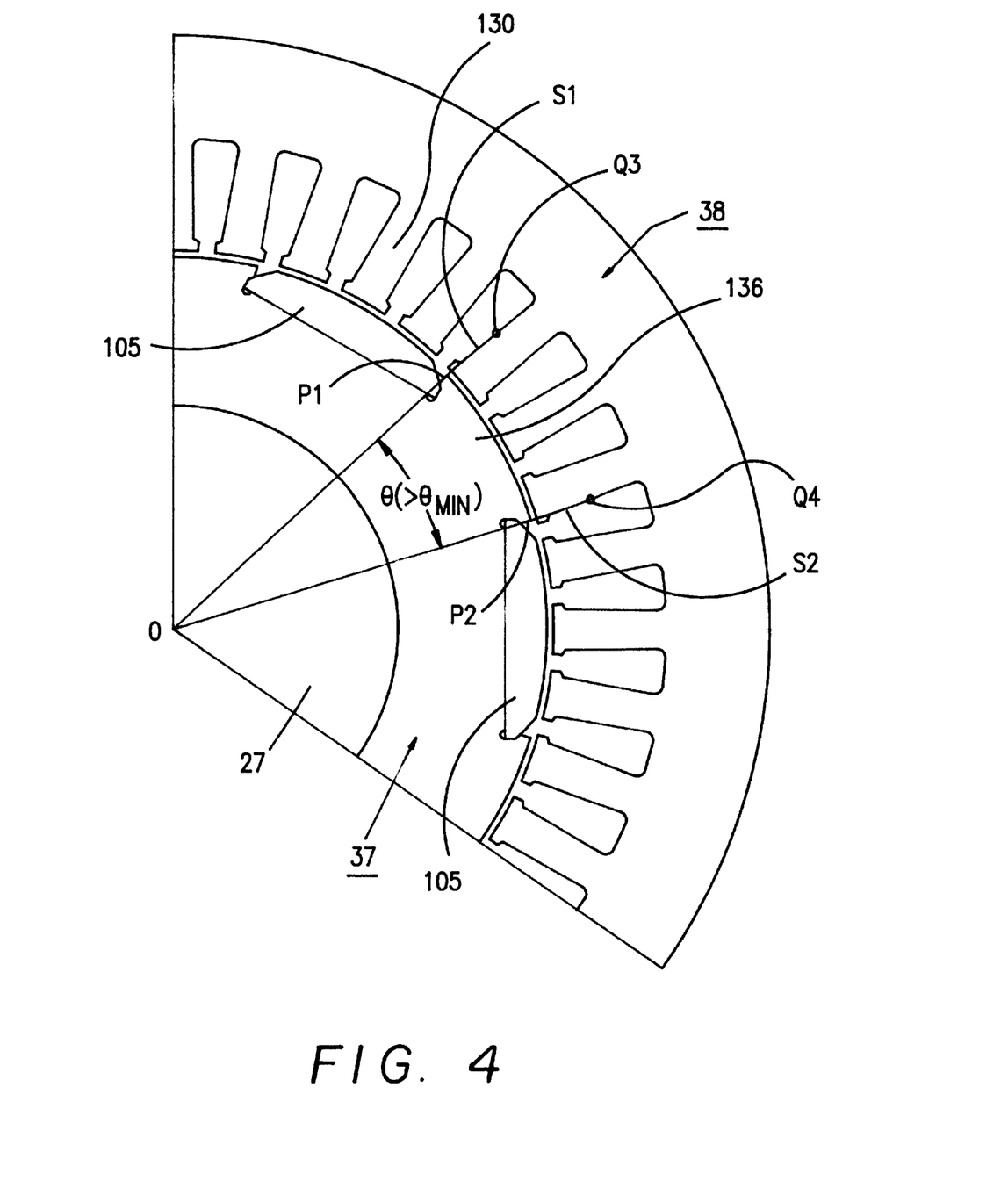
FIG. 4 is a partial sectional view of the rotor and stator of a second embodiment of the permanent magnet type synchronous motor of the present invention.
Figure 5:
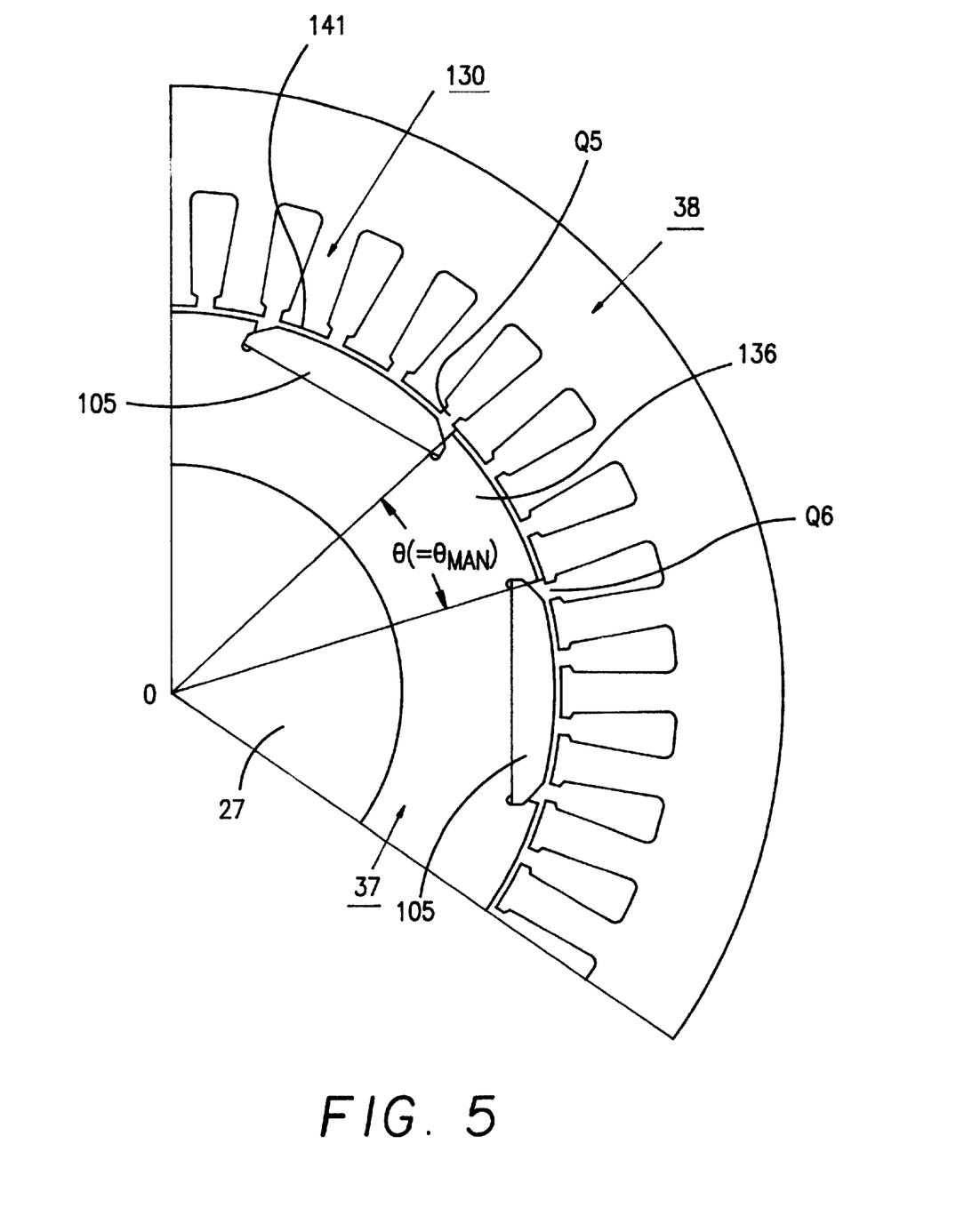
FIG. 5 is a partial sectional view of the rotor and stator of a third embodiment of the permanent magnet type synchronous motor of the present invention.

In fulfillment of the foregoing objective, the present invention provides a permanent magnet type synchronous motor including a stator having a plurality of teeth circumferentially aligned and spaced from each other by slots. A rotor mounted on a rotatable shaft is disposed radially inward of the stator and includes a plurality of circumferentially spaced permanent magnets mounted on a rotor core. The rotor core supporting the permanent magnets has a plurality of protrusions that protrude radially outward between the permanent magnets. The protrusions have a width that is determined such that an inter-pole core central angle $\theta$ is within the following range:

$$\theta_{MIN} < \theta \leq \theta_{MAX}$$

where $\theta_{MIN}$ is an angle formed between the two straight lines extending from the center of the rotatable shaft to midpoints of the tooth side faces which are the farthest apart from each other among the teeth opposing a single protrusion (FIG. 4), and $\theta_{MAX}$ is an angle formed between the two straight lines extending from the center of the rotatable shaft to two tooth-head ends which are the farthest apart from each other among the tooth-head ends of the teeth opposing (facing) a single protrusion width (FIG. 5).

This construction promotes continuous and smooth transition of the magnetic flux when an edge of any of the protrusions passes by any of the teeth, thus causing no change in the magnetic reactance. This permanent magnet type synchronous motor is thus substantially devoid of cogging, i.e. torque variation.

Figure 1:
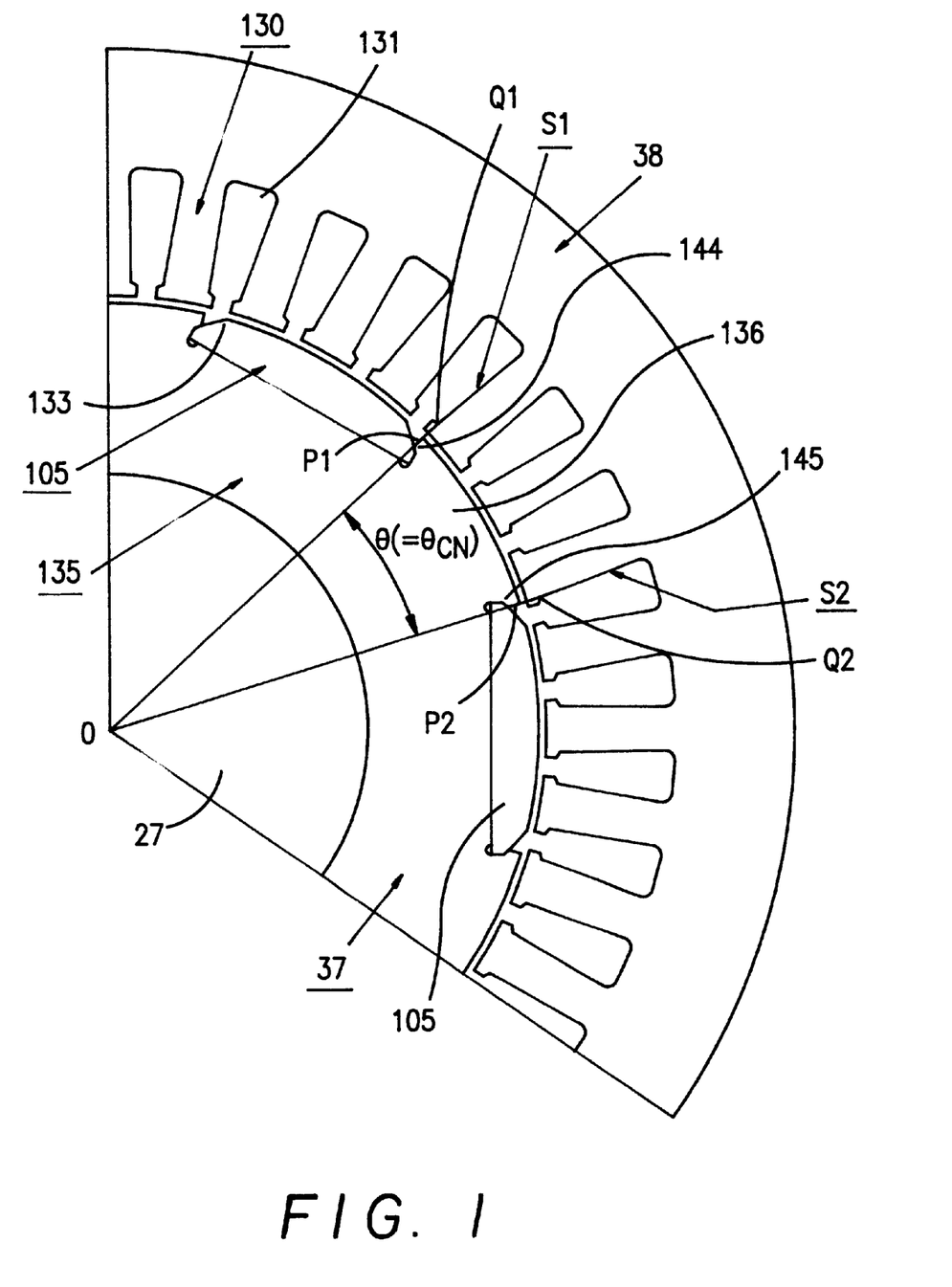
FIG. 1 is a partial sectional view of the rotor and stator of a first embodiment of the permanent magnet type synchronous motor of the present invention.

In another embodiment the protrusions have a width that is determined such that an inter-pole core central angle $\theta$ substantially equals an angle $\theta_{CN}$ formed between the two straight lines extending from the center of the rotatable shaft to free (radially inward) ends of the two tooth side faces that are the farthest apart from each other among the tooth end faces of teeth opposing a single protrusion (FIG. 1). The design of this embodiment also promotes continuous and smooth transition of the magnetic flux when an edge of any of the protrusions passes by any of the teeth, and substantially and thoroughly eliminates change in the magnetic reactance. Thus, the permanent magnet type synchronous motor of this embodiment is also substantially devoid of cogging and torque variation.

In either of the above-described embodiments, it is preferred that the circumferentially opposite ends of at least one of the protrusions be pressed radially inward by suitable holding means. This preferred construction achieves the aforementioned advantages to a greater extent.

BRIEF DESCRIPTION OF THE DRAWINGS

The foregoing and further objects, features and advantages of the present invention will become apparent from the following description of preferred embodiments when read with reference to the accompanying drawings, wherein.

DETAILED DESCRIPTION OF PREFERRED EMBODIMENTS

Preferred embodiments of the present invention will now be described in detail hereinafter with reference to the accompanying drawings.

Figure 2:
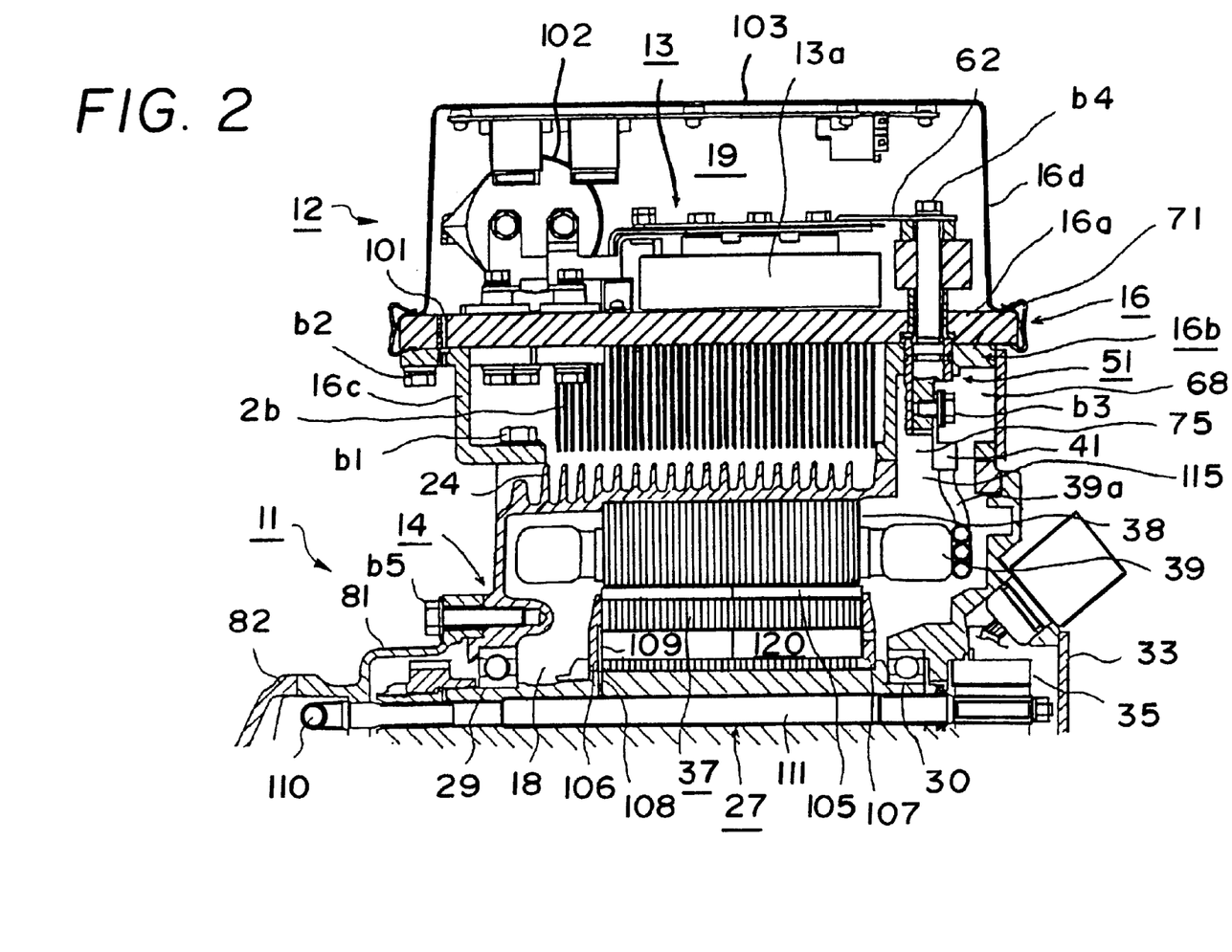
FIG. 2 is an upper half sectional view of the entire motor drive unit according to the first embodiment of the invention.
Figure 3:
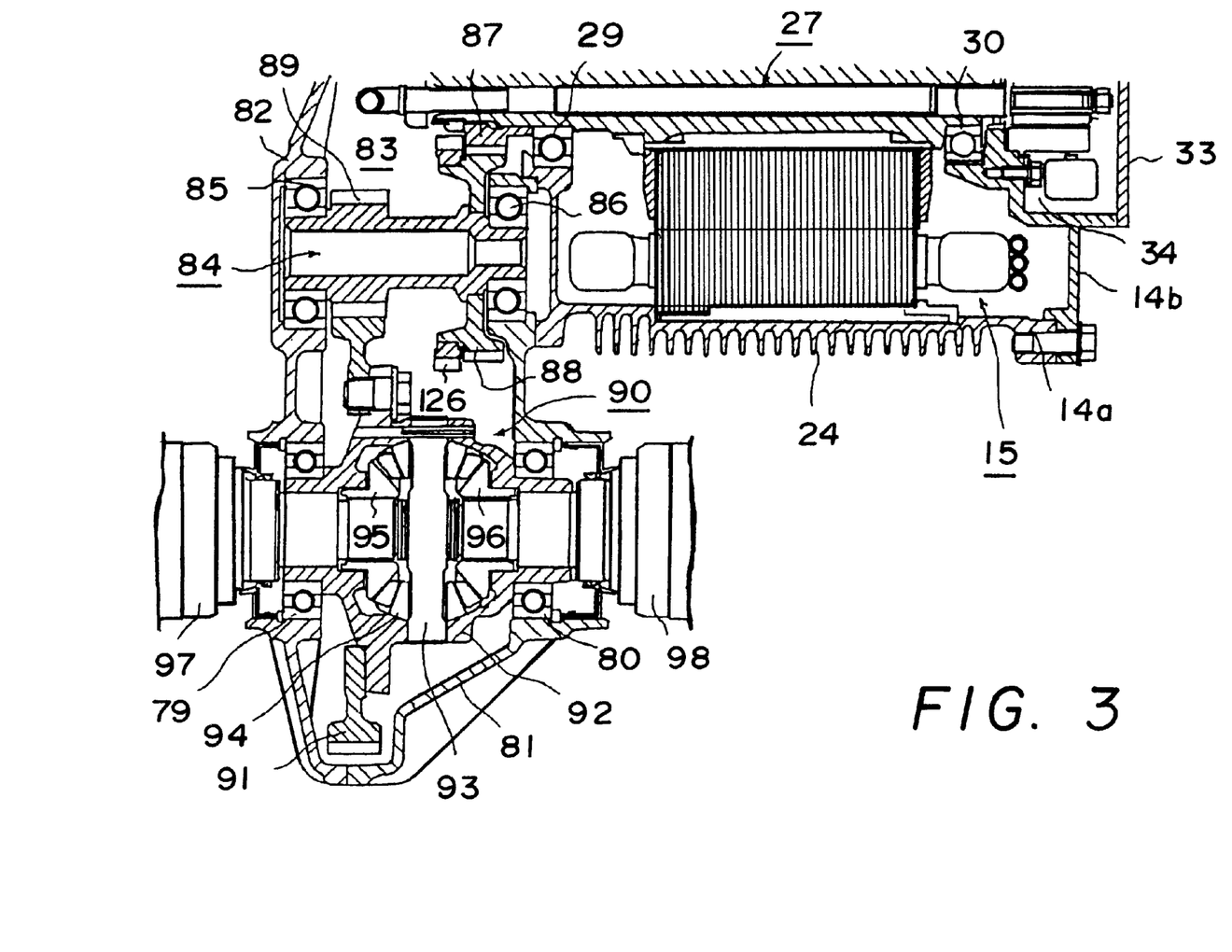
FIG. 3 is a lower half sectional view of the entire motor drive unit according to the first embodiment.

Referring to FIGS. 1 through 3, a first embodiment of the permanent magnet type synchronous motor of the invention includes a motor assembly 11, and an inverter assembly 12 housed over the motor assembly 11. The motor assembly 11 has a permanent magnet type synchronous motor 15 that is housed in a motor case 14. The inverter assembly 12 has an inverter 13, capacitor 102, a control circuit board 103, etc., which are housed in an inverter case 16.

The motor case 14 is made up of a hollow cylindrical portion 14a having a substantially complete bottom, and an end cover 14b that closes the open end of the cylindrical portion 14a to form a tightly closed motor housing chamber 18. The inverter case 16 includes a base 16a disposed substantially in the center of the case 16, an intermediate case portion 16b and a bracket 16c that extend from the base 16a to the cylindrical portion 14a of the motor case 14, and an inverter cover 16d snapped onto the base 16a to form an inverter housing chamber 19. The intermediate case 16b and the bracket 16c are detachably secured to the motor case cylindrical portion 14a by bolts b1, and to the base 16a by bolts b2.

The motor housing chamber 18 and the inverter housing chamber 19 are separated from each other by base 16a and the top wall 71 of the intermediate case 16b. The intermediate case 16b defines a housing chamber 68 therein. The housing chamber 68 communicates with the motor housing chamber 18 through an opening 75 formed in a lower portion of the intermediate case 16b and an opening 115 formed in an upper portion of the cylindrical portion 14a corresponding to the opening 75.

Although the intermediate case 16b and the bracket 16c are separate components disposed at the front and rear of the motor case 14, respectively, optionally, they may be consolidated into a single component.

The inverter housing chamber 19 is tightly closed by the base 16a and the inverter cover 16d. The base 16a and the bracket 16c have openings at mating positions so as to form a breather 101 for equalizing air pressures on opposite sides of the inverter cover 16d. Air flows in and out through the breather 101.

The cylindrical portion 14a of the motor case 14 has a plurality of fins 24 on its outer peripheral face. The fins 24 release heat generated by the permanent magnet type synchronous motor 15. In a similar fashion, a plurality of fins 26 protrude downward from the lower face of the base 16a, for releasing heat generated by the inverter 13.

Holes are formed centrally in the end face of cylindrical portion 14a and in the end cover 14b. The holes receive ends of a rotatable rotor shaft 27 which ends are rotatably supported therein by bearings 29, 30. The end cover 14b has a cylindrical protrusion formed adjacent its central hole which protrusion is covered with a lid member 33 to form a sensor chamber 34.

A resolver 38 is disposed in the sensor chamber 34, for detecting the magnetic pole position of the permanent magnet type synchronous motor 15 based on the rotation of the rotor shaft 27 extending through the central hole of the end cover 14b into the sensor chamber 34.

The permanent magnet type synchronous motor 15 is mounted substantially in the center of the rotor shaft 27 and includes a rotor 37 mounted on and fixed to the rotor shaft 27 for rotation therewith, a stator 38 fixed to the inner cylindrical surface of the cylindrical portion 14a of the motor case 14 facing the rotor 37. Coils 39 receive three-phase (U-phase, V-phase, and W-phase) alternating current provided by the inverter 13.

By supplying three-phase alternating currents to the coils 29, the rotor 37 will rotate, thus rotatably driving the rotor shaft 27.

The core of the rotor 37 is formed of a plurality of stacked steel plates and is mounted on the rotor shaft 27. A plurality of permanent magnets 105 are disposed on the outer peripheral face of the rotor 37, circumferentially spaced. The permanent magnets 105 are fixed in position between end plates 106, 107 provided at the opposing ends of t he rotor core.

A rear case 81 is mounted on the bottom of the cylindrical portion 14a by bolts b5. The rear case 81 has a recess that defines a torque transmission chamber 83 which is closed by a rear cover 82 fixed to the rear case 81. Mounted in the torque transmission chamber 83 is a counter shaft 84 extending parallel to the rotor shaft 27 and rotatably supported by bearings 85, 86.

A counter drive gear 87 is fixed to the rotor shaft 27, and a counter driven gear 88 and a parking gear 126 are fixed to the counter shaft 84. The counter drive gear 87 meshes with the counter driven gear 88. A output gear 89 is also mounted on the counter shaft 84 for output of rotation to a differential unit 90.

The differential unit 90 is provided with a ring gear 91 extending around the unit. The differential unit 90 further include s a differential casing 92 rotatably supported by bearings 79, 80, a pinion shaft 93 fixed to the differential casing 92, pinions 94 rotatably supported on the pinion shaft 93, and right and left side gears 95, 96 meshed with the pinions 94. Thus, the differential unit 90 transmits the rotation received by the ring gear 91, to right and left drive shafts 97, 98 connected to the right and left side gears 95, 96, and allows different rotational speeds of the drive shafts 97, 98.

The lowest portion of the torque transmission chamber 83 stores lubricating and cooling oil, which is transported (lifted) by rotation of the ring gear 91. The oil thereby circulates in the torque transmission chamber 83, reaching the counter drive gear 87, the counter driven gear 88, the output gear 89, and the differential unit 90 and then returning to the ring gear 91. The oil is further conducted by an oil pipe 110 into an oil passage 111 formed in the rotor shaft 27. The centrifugal force generated by rotation of the rotor 37 transports oil from the oil passage 111 into an oil passage 120 formed in the rotor 37 through an oil hole 108 formed in the rotor shaft 27 and an oil groove 109 formed in the end plate 106, thus cooling the rotor 37. Impelled by the centrifugal force, the oil also reaches and cools the coils 39.

The leads 39a of the coils 39 extend upward and connect to solderless terminals 41 that are joined to connecting members 51 by bolts 3b inside the housing chamber 68. The output terminals 62 of transistor modules 13a of the inverter 13 are connected by connecting members 51 and bolts b4 inside the inverter cover 16d.

The connecting members 51 extend from the space defined by the inverter cover 16d through the base 16a and the top wall of the intermediate case 16b into the space defined by the intermediate case 16b. The housing chamber 68 defined in the intermediate case 16b embraces lower portions of the connecting members 51. Each transistor module 13a is made up of two transistors (not shown).

Components of the permanent magnet type synchronous motor 15 according to the first embodiment will now be described in more detail. As shown in FIG. 1, the rotor 37 is fixed to the rotor shaft 27, and the stator 38 faces the outer peripheral face of the rotor 37. The permanent magnets 105, serving as the magnetic poles of the rotor 37, are embedded in a plurality of locations spaced around the circumference of the rotor 37, thus facing the stator 38. The permanent magnets 105 are supported by a rotor core 135. The rotor core 135 is provided with protrusions 136 protruding radially outward between the permanent magnets 105. The circumferentially opposed ends of each protrusion 136 are provided with lips 144, 145 overlapping and holding the permanent magnets 105 against the core in opposition to centrifugal force.

The stator 38 has teeth 130 that are circumferentially aligned with the face the rotor 37. When the coils 39 (see FIG. 2) disposed on the stator 38 are energized, the magnetic fluxes induced by the currents through the coils 39 create repelling and attracting forces between the stator 38 and the rotor 37, thus rotatably driving the rotor 37.

Because slots 131 are formed between the teeth 130 and the permanent magnets 105 are spaced from each other, the magnetic flux passing through a tooth will pass through the neighboring tooth in the next moment as the rotor 37 rotates. In the prior art when an edge 133 of a permanent magnet 105 passes by a slot 131, the transition of magnetic flux becomes discontinuous. The magnetic reactance thereby changes so that the force of attraction between the stator and the rotor fluctuates, thereby causing a cogging torque.

In the present invention, to promote continuous or smooth transition of magnetic flux and thereby prevent a change in the magnetic reactance as edges 133 of the permanent magnets 105 pass a slot 131, the width of the protrusions 136 is set as follows. The width of each protrusion 136 is determined such that the inter-pole core central angle $\theta$, that is, the angle formed between the two straight lines extending from the center O of the rotor shaft 27 to the circumferentially opposite ends P1, P2 of a protrusion 136, substantially equals the angle $\theta_{CN}$ formed between the two straight lines extending from the center O of the rotor shaft 27 to the radially inward ends Q1, Q2 of the two tooth side faces S1, S2 that are the farthest apart from each other among the side faces of three teeth 130 facing (opposing) a protrusion 136.

The thus-determined width of the protrusions 136 prevents a change in the magnetic reactance, regardless of the width of the teeth 130, thus sufficiently suppressing cogging. The width of the rotor protrusions determined as above also suppresses torque ripple. Although three teeth 130 correspond to the width of a protrusion 136 in the embodiment depicted in FIG. 1, the number of teeth 130 corresponding to the width of a protrusion 136 may vary if the width of the protrusion 136 is changed accordingly.

A second embodiment of the permanent magnet type synchronous motor of the invention is shown in to FIG. 4. Components of the second embodiment comparable to those of the first embodiment are denoted by the same reference characters in FIG. 4, and will not be described again.

According to the second embodiment, the width of the protrusions 136 is determined such that the inter-pole core central angle $\theta$ is greater than the angle $\theta_{MIN}$ formed between the two straight lines extending from the center O of the rotor shaft 27 to midpoints Q3, Q4 of the two tooth side faces S1, S2 that are the farthest apart from each other among the side faces of the three teeth 130 that correspond to the width of the protrusion 136, that is:

$$\theta > \theta_{MIN}$$

In FIG. 4, the width of each protrusion 136 is determined such that the inter-pole core central angle $\theta$ is slightly larger than the angle $\theta_{MIN}$.

A third embodiment of the permanent magnet type synchronous motor of the invention is shown in FIG. 5. Components of the third embodiment comparable to those of the first embodiment are denoted by the same reference characters and will not be described again.

According to the third embodiment, the width of the protrusion 136 is determined such that the inter-pole core central angle $\theta$ is not greater than the angle $\theta_{MAX}$ formed between the two straight lines extending from the center O of the rotor shaft 27 to the two tooth-head corner tips Q5, Q6 that are the farthest apart from each other among the head corner tips of three teeth 130 that correspond to the width 10 of the protrusion 136, that is:

$$\theta \leq \theta_{MAX}$$

In FIG. 5, the width of the protrusions 136 is determined such that the inter-pole core central angle $\theta$ equals the angle $\theta_{MAX}$, that is:

$$\theta = \theta_{MAX}$$

Figure 6:
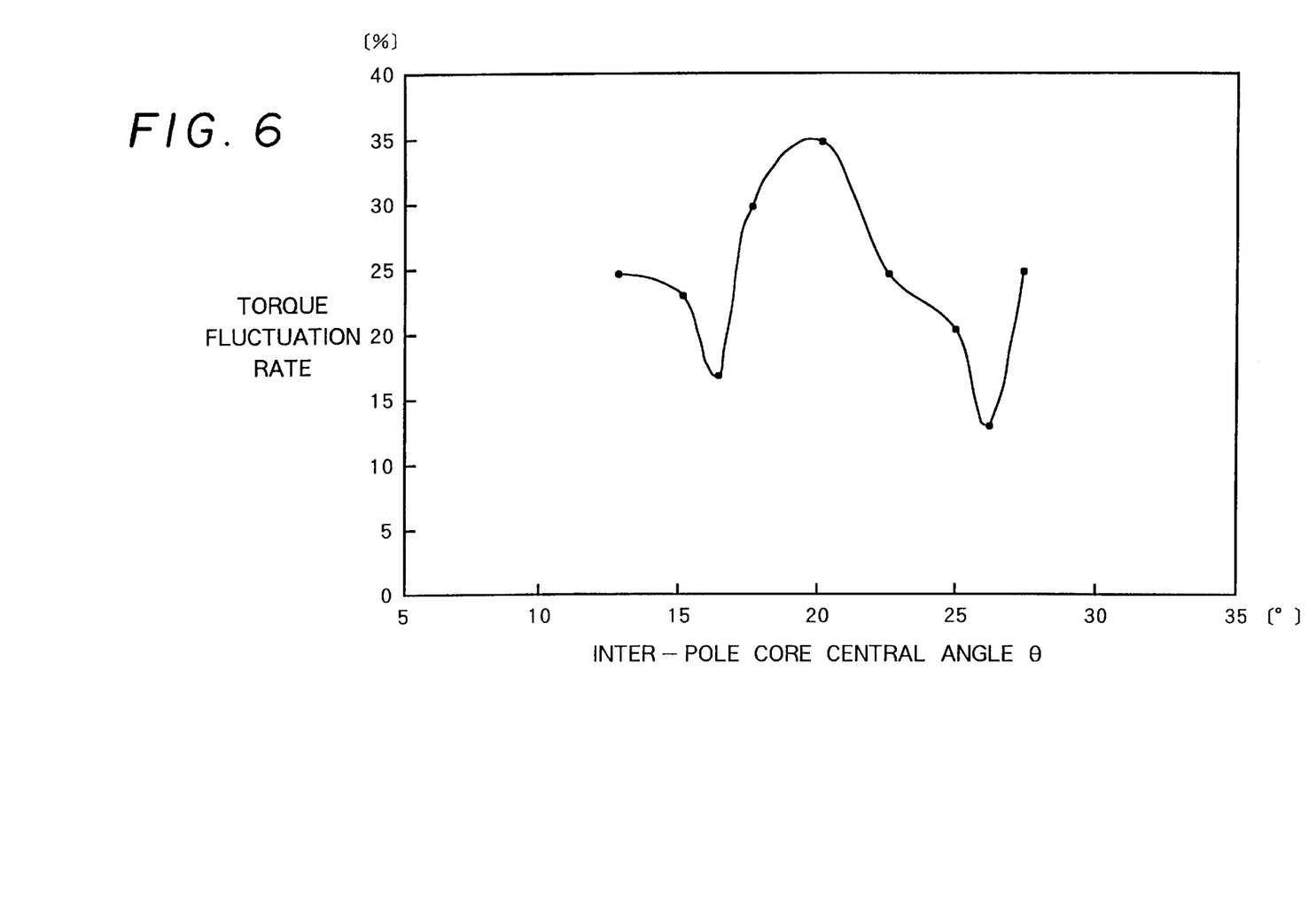
FIG. 6 is a graph of the torque fluctuation rate versus the inter-pole core central angle for an electric motor in accordance with the present invention.
Figure 7:
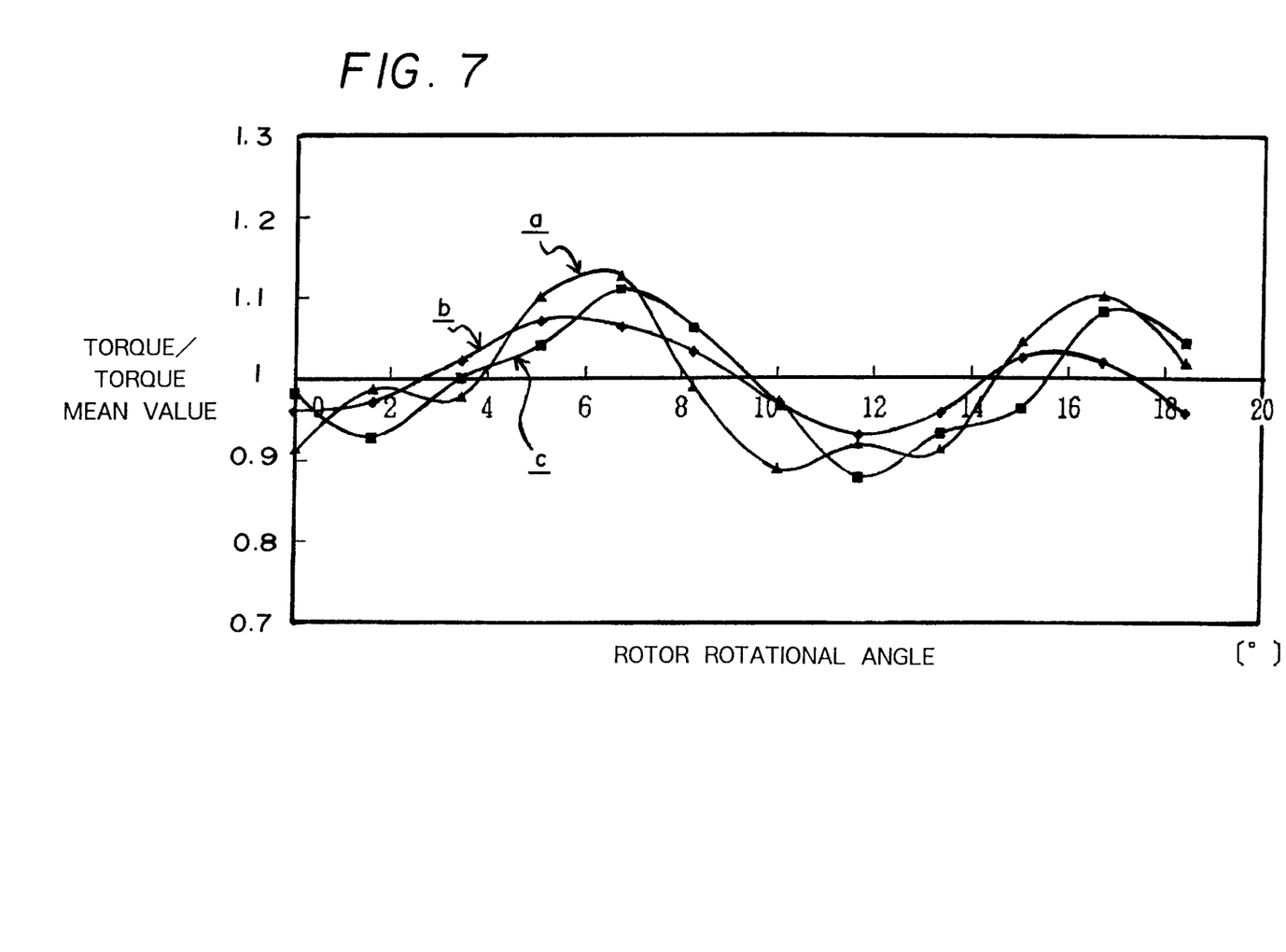
FIG. 7 is a graph of torque/torque mean value versus the rotor rotational angle.

The torque produced by the permanent magnet type synchronous motor 15 according to the above embodiments is illustrated in FIGS. 6 and 7. The graph of FIG. 6 indicates the relationship between the inter-pole core central angle and the torque fluctuation rate, where the abscissa represents the inter-pole core central angle $\theta$ and the ordinate represents the torque fluctuation rate. The graph of FIG. 7 indicates the relationship between the rotor rotational angle and the torque/torque mean value, where the abscissa represents the rotor rotational angle and the ordinate represents the torque/torque mean values.

As understood from the variation of the torque fluctuation rate in dependence upon the inter-pole core central angle $\theta$, as indicated in FIG. 6, where the slot pitch is fixed at 10°, the torque fluctuation rate is small for an inter-pole core central angle $\theta$ within the following range:

$$25° < \theta < 27.5°$$

Therefore, cogging is sufficiently suppressed if the inter-pole core central angle $\theta$ is in this range. In addition, provided that the slot pitch is 10°, the angles $\theta_{MIN}$ and $\theta_{MAX}$ are as follows:

$$\theta_{MIN} = 25°$$

$$\theta_{MAX} = 27.5°$$

The torque fluctuation rate becomes the smallest when:

$$\theta = 26°$$

Provided that the slot pitch is 10°, the angle $\theta_{CN}$ becomes:

$$\theta_{CN} = 26°$$

In the graph of FIG. 7, the relationships between the rotor rotational angle and the torque/torque mean value are indicated by curve a where the inter-pole core central angle $\theta$ is 27.5°, curve b where the inter-pole core central angle $\theta$ is 26°, and curve c where the inter-pole core central angle $\theta$ is 25°.

Manufacture of the rotor 37 of the permanent magnet type synchronous motor 15 (see FIG. 3) is as follows:

STEP 1

Materials, such as Nd, Fe, B, Co, etc., are melted to obtain a magnetic alloy ingot. The ingot is broken down into powder, which is then formed into the D-shape masters of permanent magnets 105 (see FIG. 1) in a magnetic field. The D-shape masters are sintered and then aged (annealed).

STEP 2

The permanent magnets 105 are subjected to grinding to form taper faces that will abut against the magnet holding portions 144, 145 of the rotor core 135, thus completing formation of the permanent magnets 105. Optionally, curved faces which do not contact the magnet holding portions 144, 145 may also be ground in this step.

STEP 3

The permanent magnets 105 are subjected to surface treatment by Ni rack plating or Ni barrel plating.

STEP 4

Magnetic steel plates each having a protrusion 136 and magnet holding portions 144, 145 are blanked out using a press.

STEP 5

The magnetic steel plates are stacked and fitted on the rotor shaft 27, thus forming the rotor core 135.

STEP 6

The permanent magnets 105 are inserted separately into the recesses that are formed between the protrusions 136 of the rotor core 135 and, more specifically, partly defined by the radially inner faces of the magnet holding portions 144, 145, by sliding each permanent magnet 105 parallel to the axis of the rotor shaft 27. Thus, the permanent magnets 105 are fixed in radial position by the magnet holding portions 144, 145 of the magnetic steel plates.

STEP 7

The end plates 106, 107 are fitted onto the rotor shaft 27 at the opposite ends of the rotor core 135, thus forming the rotor 37. Thus the permanent magnets 105 are fixed in axial position by the end plates 106, 107.

STEP 8

The rotor 37 is placed in a magnetic yoke and subjected to a magnetic field created by pulse currents to simultaneously magnetize the poles of all the permanent magnets 105 of the rotor 37, thus completing production of the rotor 37.

Although the above embodiments have magnet holding portions 144, 145 formed on the opposite ends of each protrusion 136 (FIG. 5), the magnetic holding portions 144, 145 may be omitted.

A fourth embodiment of the permanent magnet type synchronous motor of the invention will now be described with reference to FIG. 8 and FIG. 9, which compares a permanent magnet type synchronous motor having magnet holding portions and a permanent magnet type synchronous motor having no magnet holding portions. Components of the fourth embodiment comparable to those of the first embodiment are denoted by the same reference characters, and will not be described again.

Figure 8:
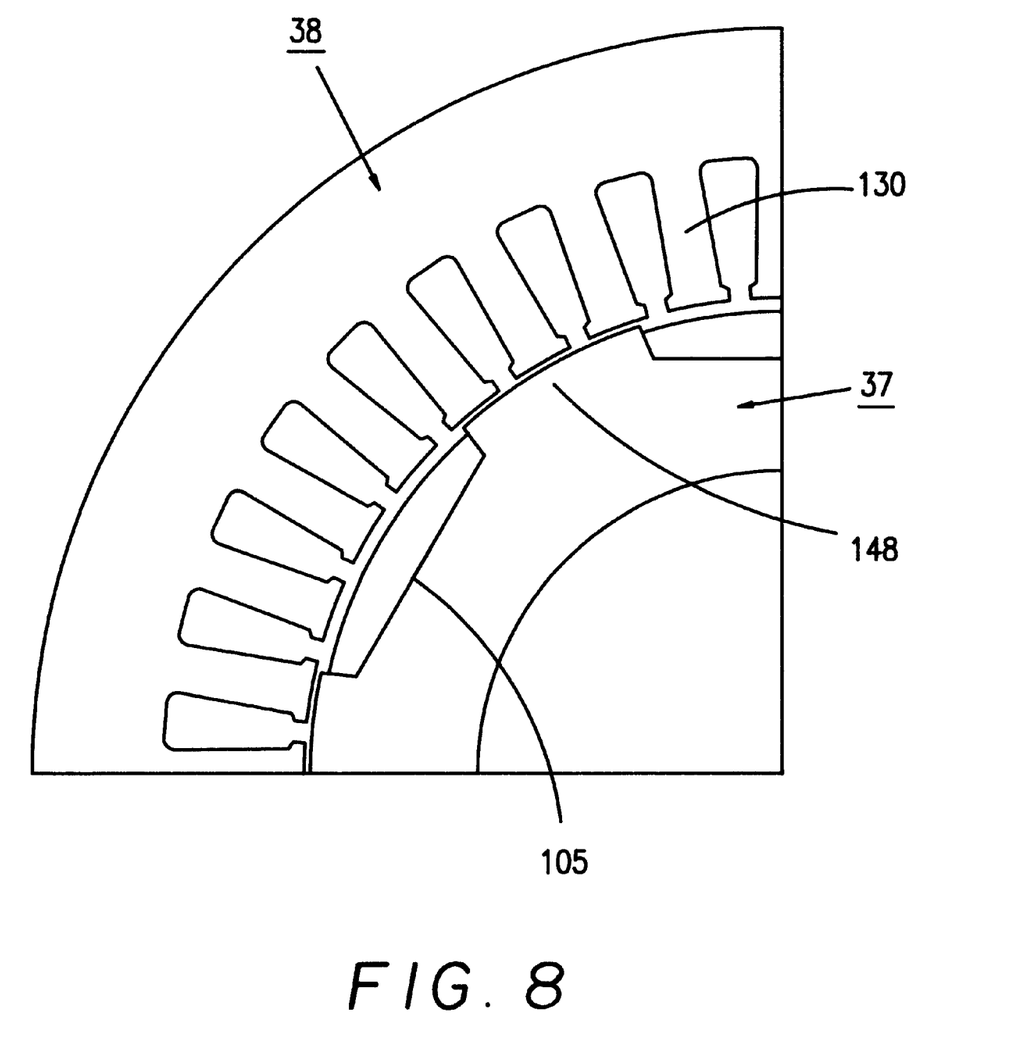
FIG. 8 is a partial sectional view of the rotor and stator of a fourth embodiment of the permanent magnet type synchronous motor of the present invention.

Referring to FIG. 8, similar to the above embodiments, the fourth embodiment includes a rotor 37, a stator 38, permanent magnets 105, teeth 130 and protrusions 148. However, according to the fourth embodiment, no magnet holding portion is formed on a circumferential end of any of the protrusions 148.

Figure 9:
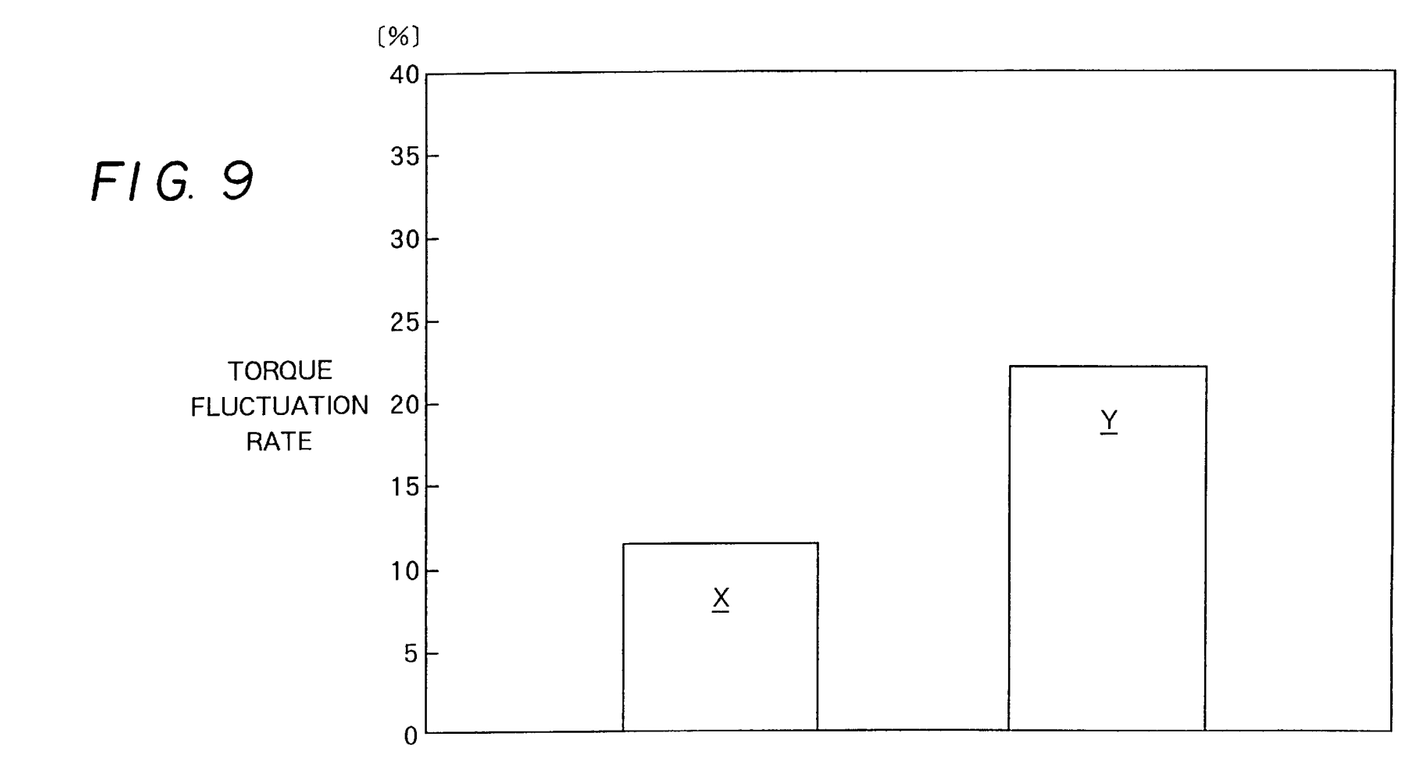
FIG. 9 is a bar graph comparing torque fluctuation rate between a permanent magnet type synchronous motor having a magnet holder and a permanent magnet expression synchronous motor having no magnet holder.

Referring to FIG. 9, where bar X indicates the torque fluctuation rate with magnetic holding portions and bar Y indicates the torque fluctuation rate without magnetic holding portions, it is apparent that the magnet holding portions reduce the torque fluctuation rate, that is, substantially suppress cogging.

While the present invention has been described with reference to what are presently considered to be preferred embodiments thereof, it is to be understood that the invention is not limited to the disclosed embodiments. On the contrary, the invention is intended to cover various modifications and equivalent arrangements included within the spirit and scope of the appended claims.

What is claimed is:

1. A permanent magnet type synchronous motor comprising:

a stator having a plurality of teeth spaced to define slots therebetween and circumferentially aligned to define an interior cylindrical surface for the stator, each of said teeth having two side faces terminating at a distal head, each of said distal heads spanning circumferentially spaced head ends, thereby providing a plurality of head ends spaced around said interior cylindrical surface;

a rotatable shaft mounted within a central space defined by said interior cylindrical surface of said stator; and a rotor comprising a rotor core fixed to the rotatable shaft for rotation therewith and a plurality of permanent magnets mounted on said rotor core at a plurality of locations circumferentially spaced around said rotor core, facing the stator, said rotor core having a plurality of protrusions that respectively protrude radially outward between adjacent permanent magnets, said protrusions having a width defining an inter-pole core central angle θ in the range:

$$\theta_{MIN} < \theta \leq \theta_{MAX}$$

wherein $\theta_{MIN}$ is an angle formed between two straight lines extending from the center of said rotatable shaft to midpoints of two tooth side faces which are the farthest apart from each other among the tooth side faces of a tooth or teeth corresponding to said protrusion width, and $\theta_{MAX}$ is an angle formed between two straight lines extending from the center of the rotatable shaft to two of said plurality of head ends, said two head ends being the farthest apart from each other among the head ends of a tooth or teeth corresponding to the protrusion width.

2. A permanent magnet type synchronous motor comprising:

a stator having a plurality of teeth spaced to define slots therebetween and circumferentially aligned to define an interior cylindrical surface for the stator, each of said teeth having two side faces terminating at distal ends;

a rotatable shaft mounted within a central space defined by said interior cylindrical surface of said stator; and a rotor comprising a rotor core fixed to the rotatable shaft for rotation therewith and a plurality of permanent magnets mounted on said rotor core, at a plurality of locations circumferentially spaced around said rotor core and facing the stator, said rotor core having a plurality of protrusions that respectively protrude radially outward between adjacent permanent magnets, said protrusions having a protrusion width defining an inter-pole core central angle θ which is substantially equal to an angle $\theta_{CN}$ formed between two straight lines extending from the center of said rotatable shaft to said distal ends of two tooth side faces which are the farthest apart from each other among the tooth side faces of a tooth or teeth corresponding to said protrusion width.

3. A permanent magnet type synchronous motor according to claim 1, wherein circumferentially opposite ends of at least one of said protrusions are pressed radially inward.

4. A permanent magnet type synchronous motor according to claim 2, wherein circumferentially opposite ends of at least one of said protrusions are pressed radially inward.

\* \* \* \* \*